March 16, 1954

C. V. CROCKETT 2,672,294

HEATING SYSTEM FOR AUTOMOBILES

Filed Oct. 14, 1950

Inventor
Clarence V. Crockett
By
Willits, Helmig & Baillio
Attorneys

March 16, 1954

C. V. CROCKETT 2,672,294

HEATING SYSTEM FOR AUTOMOBILES

Filed Oct. 14, 1950

Inventor
Clarence V. Crockett
By Willits, Helwig & Baillio
Attorney

March 16, 1954

C. V. CROCKETT 2,672,294

HEATING SYSTEM FOR AUTOMOBILES

Filed Oct. 14, 1950

Inventor
Clarence V. Crockett
By Willits, Helwig & Baillio
Attorneys

Patented Mar. 16, 1954

2,672,294

UNITED STATES PATENT OFFICE 2,672,294

HEATING SYSTEM FOR AUTOMOBILES

Clarence V. Crockett, Birmingham, Mich., assignor to General Motors Corporation, Detroit, Mich., a corporation of Delaware Application October 14, 1950, Serial No. 190,136

14 Claims. (Cl. 237—8)

The invention relates to systems for heating automobiles and has particular relation to apparatus for heating and recirculating air in the lower part of an automobile body and for introducing fresh, heated air into the upper part of an automobile body, the latter being for the dual purposes of heating the automobile and of defrosting the windshield or windows thereof.

An object of the invention is to provide in an automobile heating system, a single control element that will quickly respond to any changes in outside or inside temperatures that may affect the system.

Another object of the invention is to provide a combination heater and defroster system that will respond to the operation of a single temperature responsive control element, the latter being actuated by various temperature conditions and effects which may result from changes in temperature either inside or outside of the automobile body.

Another object of the invention is to provide a combination heater and defroster system capable of being manually set or adjusted to provide any desired amount of heating in the interior of an automobile body but which will act to heat the automobile at a rate exceeding the adjusted rate and until the automobile has been heated to a temperature corresponding to the predetermined setting of the manual control referred to.

It is proposed to provide the interior of an automobile body with an air recirculating heater and a fresh air heater and with a single control by which one of these may be employed for heating the body or by which both may be employed. The recirculating heater may be placed under one of the front seats of the automobile or elsewhere as desired and may be employed for heating the automobile without employing the fresh air heater or the two may be employed simultaneously. The fresh air heater also may be employed for defrosting the windshield or other windows of the car and it may be employed either with or without operating the fan which controls the heating of the automobile by the underseat heater. The two heaters are adapted to be controlled by a single heating fluid control valve having a power element which is affected by the temperature of the outside air, by the temperature of the air delivered by the fresh air heater, by the temperature of the air inside of but immediately adjacent the fresh air heater and by the temperature of the air within the body but remote from the fresh air heater.

In the accompanying drawings:

Figure 3 is taken substantially in the plane of line 3—3 of Figure 2.

Figure 4, while taken substantially in the plane of line 4—4 on Figure 3, shows a fragment of the heating element as the same would appear looking at a section through the remote side of the element.

Figure 2:
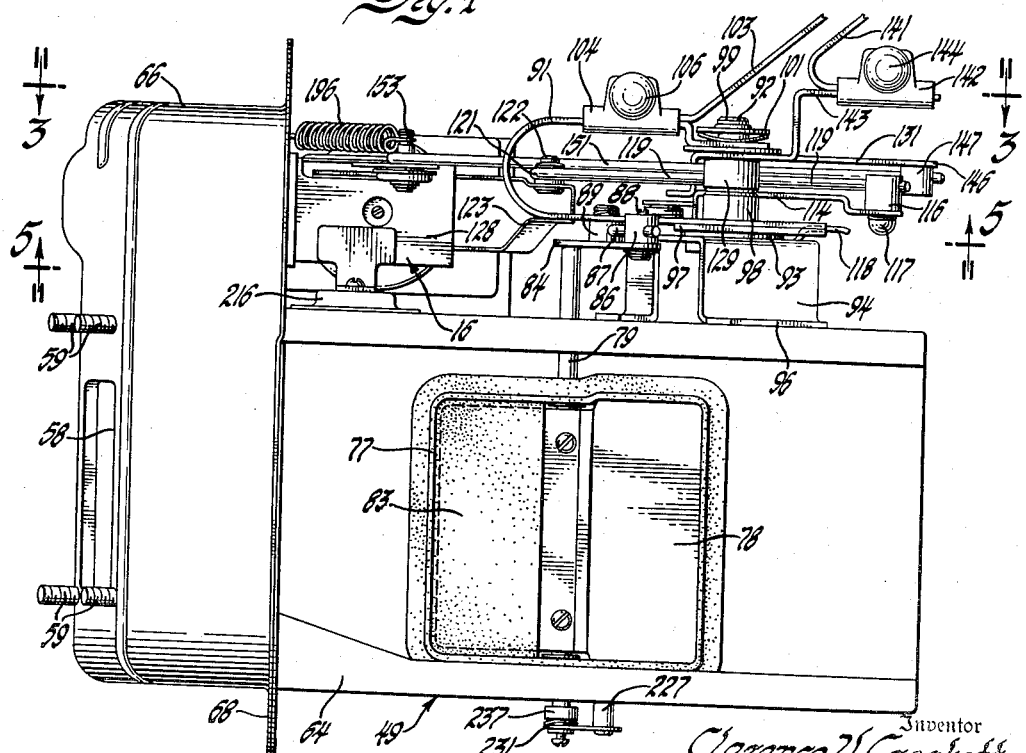
Figure 2 is a partial plan view of a fresh air heater and defroster unit including a control mechanism for the heating system and constituting a part of the apparatus of the system embracing the principles of the invention.
Figure 3:
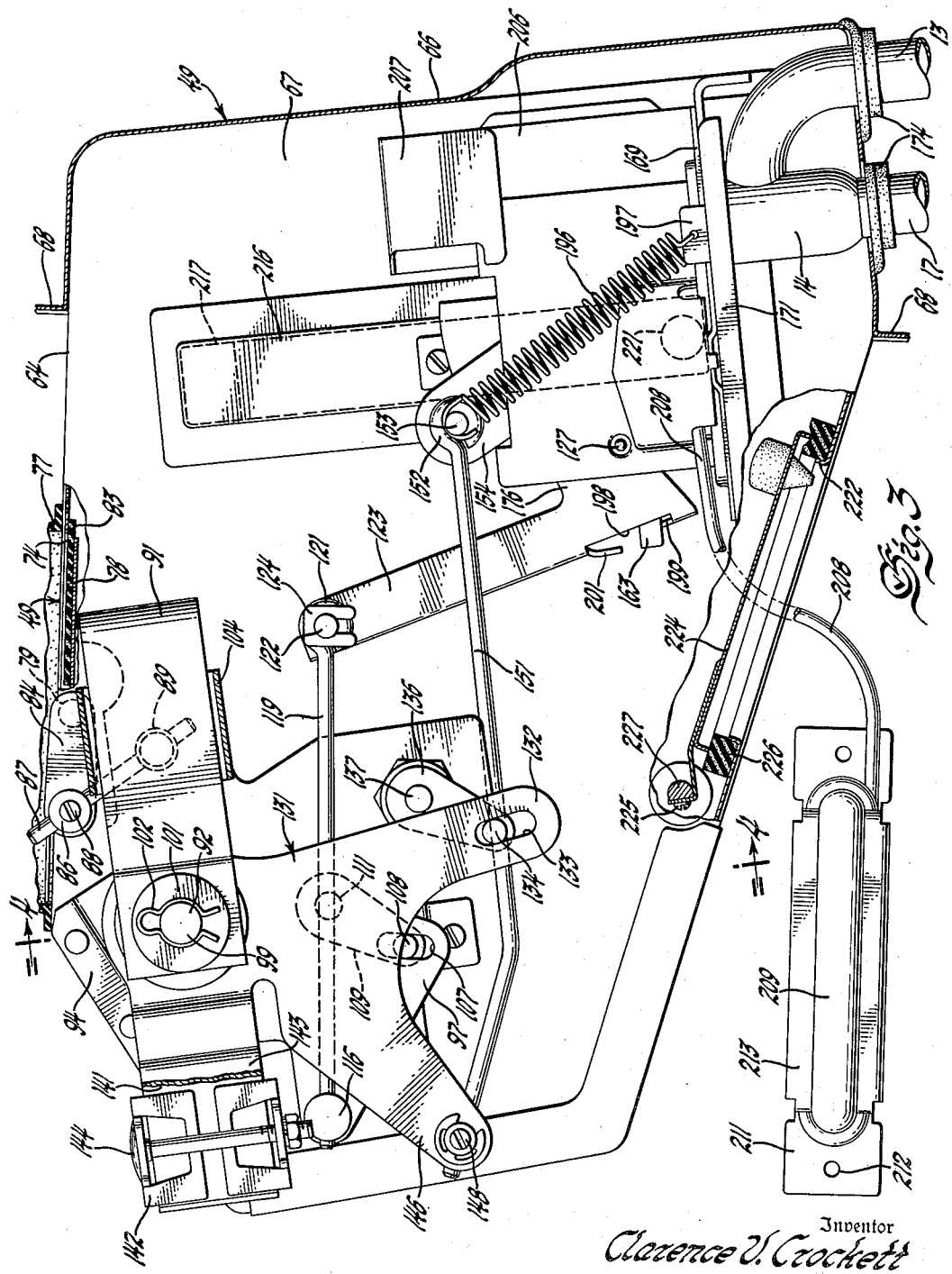
Figure 3 is a side elevational view of the structure illustrated by Figure 2, certain parts of Figure 3 being broken away and shown in cross-section so as better to illustrate the various features of the structure shown.
Figure 4:
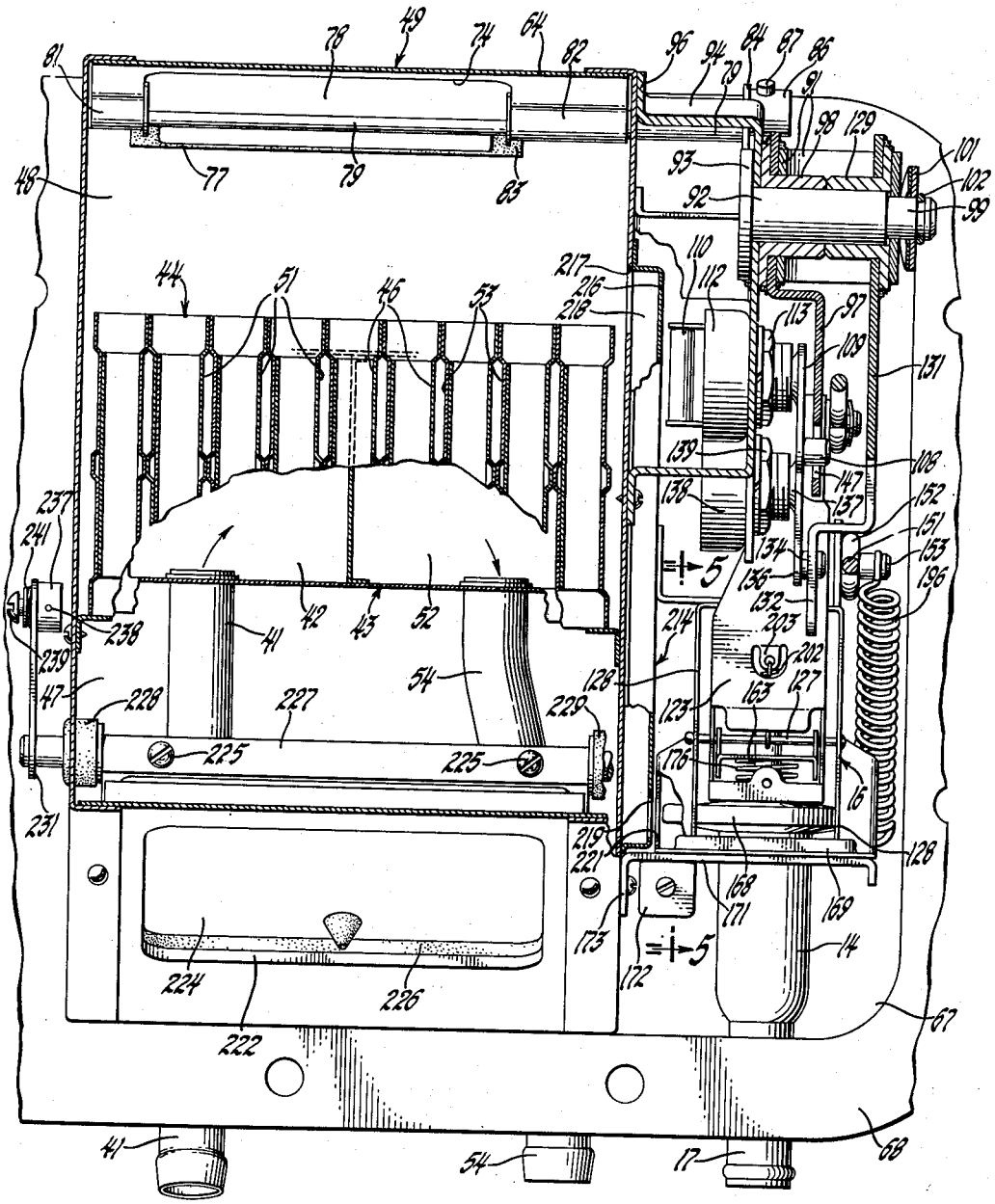
Figure 4 is a transverse sectional view through the structure illustrated by Figures 2 and 3.
Figure 5:
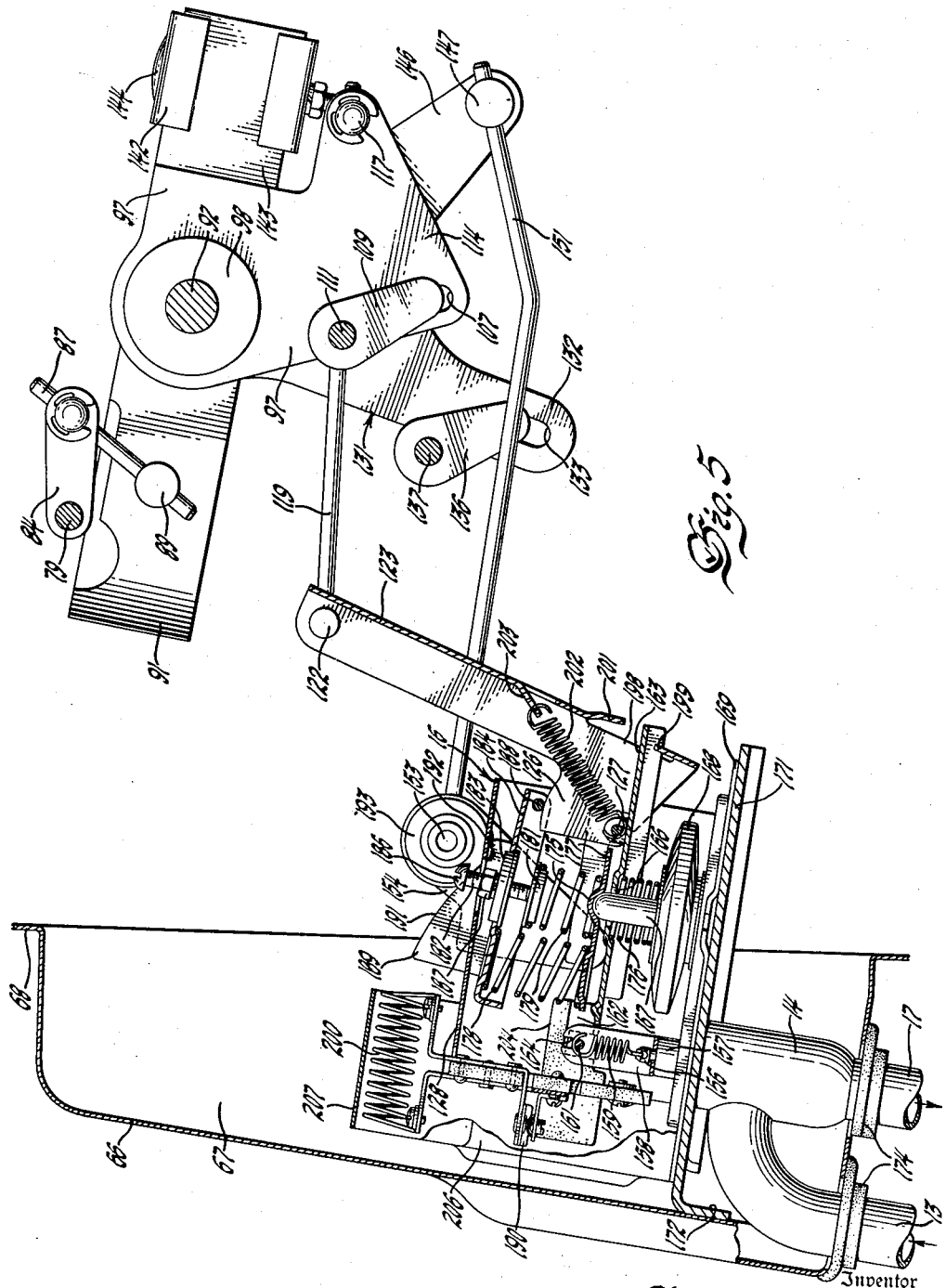

Figure 5 is a vertical sectional view of the structure as shown particularly by Figures 2, 3, and 4. Figure 5 is taken substantially in the plane of line 5—5 on Figures 2 and 4 and looking outwardly from a vertical plane intersecting the control mechanism.

Figure 6:
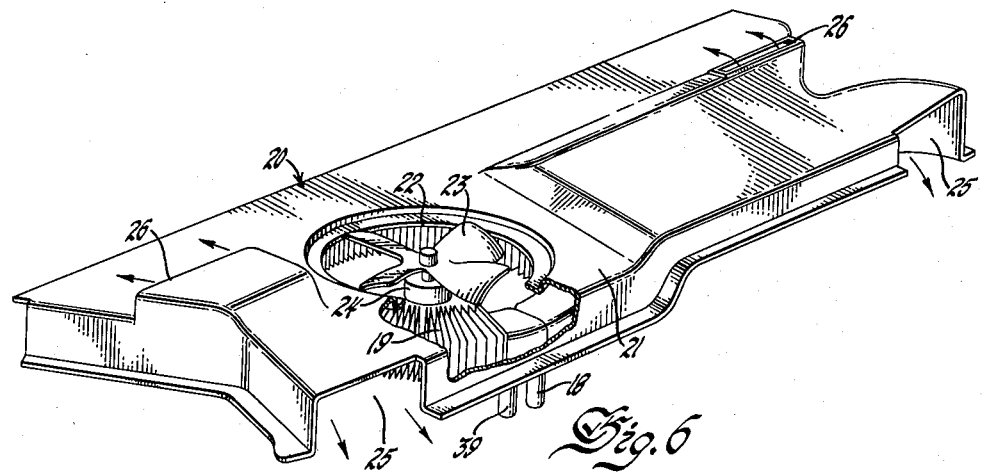

Figure 6 is a perspective view of an underseat heater employed in the system.

Figure 7:
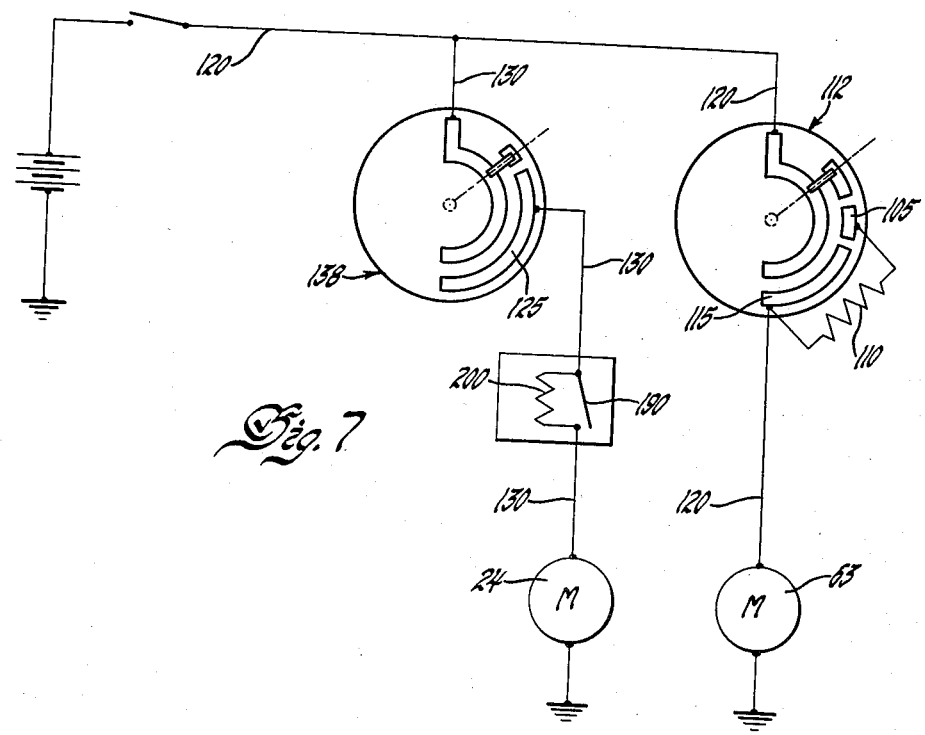

Figure 7 is a wiring diagram showing the electrical connections between the various elements comprising the system.

Figure 1:
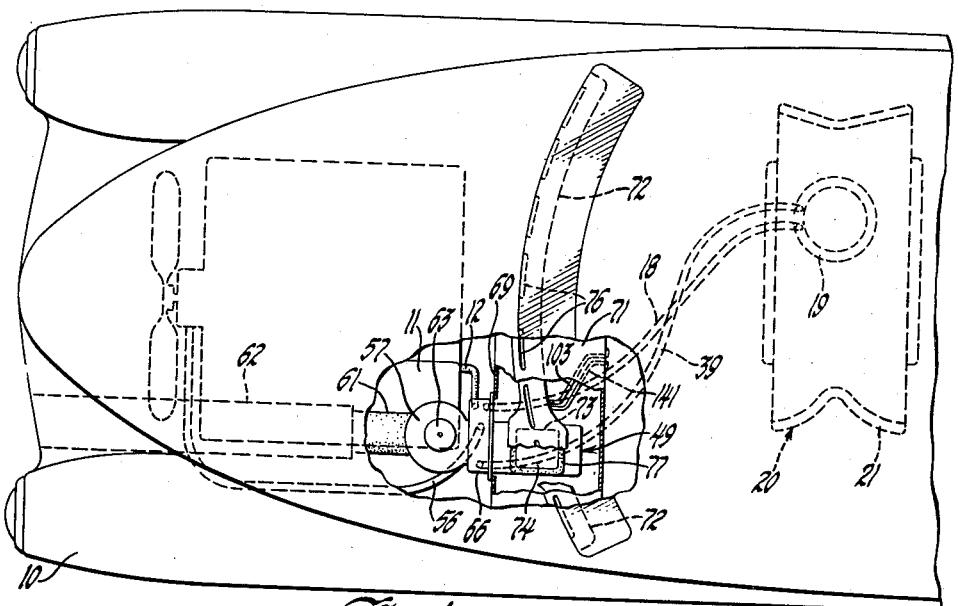
Figure 1 is a diagrammatical plan view of the front part of an automobile body including a heating system embracing the principles of the invention. Certain parts of the body are broken away to better illustrate certain elements of the system structure.

In Figure 1 of the drawing there is illustrated an automobile 10 having an engine 11 provided with a water cooling system from which heating fluid for the heating system embracing the principles of the invention is supplied by the supply conduit 12. As is best shown in the remaining figures of the drawing, the conduit 12 is adapted to be secured to the inlet coupling 13 of a heating fluid control valve 14, the valve 14 being constructed as an integral part of a temperature responsive heating fluid control mechanism or thermostatically actuated valve indicated generally by the numeral 16. The outlet coupling 17 leading from the valve 14 is adapted to be connected by a suitable conduit 18 to one side of the heating element 19 of an underseat heater indicated generally at 20. The underseat heater 20 is adapted to be disposed beneath the front seat of the automobile 10, to distribute air heated by the element 19 both forwardly and rearwardly from the opposite ends thereof and from beneath the front seat referred to. The heating element 19 may be placed somewhat to one side of the middle portion of the space beneath the front seat referred to and in such event the supply conduit 18 should be connected to the heater element coupling which leads to the side of the heater element 19 nearest the middle of the front seat. This side of the underseat heater element 19 will be called the inside of the underseat heater element and the opposite side will be called the outside of the underseat heater element. The supply conduit 18 should be connected to the inside of the underseat heater element as indicated, for the reason that such inside of the element is farther from the opposed side wall of the body of the automobile than is the outside of the underseat heater element from the other side wall of the body. The inside of the element therefore must satisfy a greater demand for heating. If the hottest heating fluid is supplied to the inside of the heating element 19, then this side of the heating element will be capable of heating more air than the outside of the heating element as may be required.

The underseat heater comprises a sheet metal shell 21 which extends from one end toward the other and approximately from front to back of the space beneath the front seat of the automobile. The shell is provided with an opening 22 corresponding to the open interior of the heater element 19 and extends over the heater element 19 in such manner that the opening referred to provides an inlet through which air be recirculated and heated by the underseat heater is supplied to the heater element 19. The space within the central part of the heater element 19 is occupied by a fan 23 and a motor 24 for driving the fan, the blades of the fan being so constructed as to discharge air downwardly and outwardly through the radially disposed fins with which the heater element 19 is provided. The air so discharged is heated by the fins and the tubes projecting therethrough and is collected beyond the extremities of these fins in an annular distribution passage which is formed in the shell around the heater element 19. From this distribution passage, the heated air is conducted by oppositely disposed passages formed between the shell and the floor of the automobile body, the shell being further formed at the opposite ends thereof with forwardly and rearwardly disposed outlet passages 25 and 26 respectively with which the opposite ends of the oppositely disposed distribution passages communicate. The heated air is discharged through these forwardly and rearwardly disposed passages at the opposite ends of the shell in parallel relation to the floor and forwardly and rearwardly with respect to the ends of the front seat adjacent which the shell is disposed.

The heating fluid is conducted from the heating element 19 of the underseat heater referred to by a conduit 39 and one end of which is connected to the underseat heater element 19 by the outlet coupling leading from the outside part of the heater element. The opposite end of the conduit 39 is connected to an inlet coupling indicated at 41 which leads to the inlet side or chamber 42 of a heating fluid header 43. The header 43 is formed as a part of and comprises one end of a heat exchange element 44 which is fabricated in such a way as to provide parallel passages 46 through which air may be circulated from inlet compartment 47 to outlet compartment 48 of a fresh air heating unit or heater 49.

The heating fluid received by inlet chamber 42 of header 43 is discharged across the heating element 44 and transversely with respect to air passages 46 through transversely disposed heating fluid passages 51. At the opposite ends of passages 51 the heating fluid is collected by a single header extending entirely across the adjacent end of the heating element 44. From such header the heating fluid is returned to outlet chamber 52 of header 43 by similar transversely disposed passages indicated by the numerals 53.

The air within the fresh air heater 49 which flows upwardly through the heating element 44 from the heater inlet 47 to the heater outlet 48 is heated in the usual manner by the heating fluid flowing in the circuitous path described through heating fluid passages 51 and 53 from header inlet chamber 42 to header outlet chamber 52. The heating fluid from the header outlet chamber 52 is discharged from the heater 49 through outlet coupling 54 which is connected to the low pressure side of the water circulating system of the engine 11 by conduit 56.

Air is supplied to the air inlet compartment 47 of the fresh air heater 49 by a blower indicated at 57. The discharge end of the blower is connected to the heater 49 at heater inlet opening 58 and by bolts indicated at 59. The inlet side of the blower 57 is indicated at 61 and is connected to the rear end of fresh air supply conduit indicated at 62. The forward end of the supply conduit 62 communicates with an opening in the front end of the automobile 10 and through which air for cooling the radiator of the automobile and for other purposes is supplied. The blower 57 is driven by a motor 63 which is controlled in a manner to be hereinafter described.

The fresh air heater 49 comprises a somewhat irregularly shaped casing 64, an open end portion of which is adapted to be closed by a flanged shell indicated at 66. The shell 66 is formed in such a way as to fit three sides of the end of the casing 64 but is larger than the casing 64 at one side thereof and projects beyond the casing 64 to provide a control compartment indicated at 67. Flange 68 which projects outwardly from the edge of shell 66 is employed in securing the entire structure of the fresh air heater 49 in an opening which is formed in the fire wall or dash 69 which extends between the engine compartment and the passenger compartment of the automobile 10. The flange 68 is secured by screws or other fastener means, not shown.

The fresh air heater 49 is secured in the opening referred to in such a way that the closed end of the shell 66 projects into the engine compartment and the remaining parts of the casing 64 project rearwardly with respect to the fire wall 69 and into the passenger compartment of the automobile and beneath the instrument panel indicated at 71. The hollow interior of the instrument panel 71 contains a warm air distribution duct 72, having an inlet 73 adapted to be connected to an outlet opening 74 formed in the upper wall of the casing 64. The distribution duct 72 has a plurality of outlet openings indicated at 76 and formed along the front edge of the upper wall thereof for the purpose of discharging heated fresh air into the upper part of the body of the automobile and against and throughout practically the entire extent of the windshield or front window of the automobile.

The capacity of the fresh air heater 49 and of the duct 72 and the various passages and openings leading thereto and therefrom is sufficient not only for the purpose of defrosting the automobile windshield but for the purpose of supplementing the heating of the automoible by introducing fresh air into the upper regions thereof.

The inlet opening 73 for the duct 72 is connected to the outlet opening 74 for the discharge chamber 48 in the casing 64 by a flexible and extensible rubber conduit indicated at 77 and having flanges formed at the upper and lower extremities thereof for providing sealing means by which the surfaces adjacent the openings 73 and 74 are sealed.

The flow of heated air through the opening 74 is controlled by an air valve 78 which is mounted on a shaft 79 journalled at opposite ends in bearings 81 and 82 formed in the upper wall of the casing 64. One side of the air valve 78 is provided with a gasket 83 made of rubber or other suitable resilient material for preventing the air valve from making noise when being closed. The shaft 79 projects outside the casing 64 and there is provided with an operating arm 84 by which the valve 78 may be opened and closed. The end of the arm 84 is provided with a rotating coupling 86 having a transverse opening therein in which the end of an operating rod 87 is secured by a screw 88. The opposite end of the rod 87 is secured by a similar screw in a transverse opening formed in a rotating coupling indicated by the numeral 89. The coupling 89 is secured to one side of a U-shaped bracket 91, the opposite ends of which are rotatably mounted upon a stationary stud or shaft indicated at 92. The shaft 92 has an enlarged head indicated at 93 which is welded or otherwise secured to the inside surface of a bracket 94 having an opening through which the shaft 92 projects from the head 93. The bracket 94 has laterally disposed and oppositely flanged ends 96 which are secured to the side of the casing 64 by screws or other suitable fastening means. One end of the U-shaped bracket 91 is welded or otherwise secured to an arm 97 which in turn is welded or otherwise secured to the peripheral edge of a flanged sleeve 98. The sleeve 98 projects through aligned openings formed in the arm 97 and in the end of the bracket 91 and the interior surface of the sleeve receives and provides a bearing on which the bracket 91 and the sleeve 98 rotate upon the shaft 92. The opposite end of the U-shaped bracket 91 is provided with an opening for receiving a reduced end 99 of the shaft 92 and is rotatably mounted directly thereon. This end of the bracket 91 is secured upon the shaft end 99 by a spring retaining washer 101 and a snap ring 102.

The U-shaped bracket 91 is operated by a lever 103, the end of which is secured to the outer part of the bracket 91 by an expansible coupling 104 having a bolt 106 for tightening the coupling upon the end of the lever 103 and the outer part of the U-shaped bracket 91.

It will be apparent that when the outer end of the lever 103 is depressed, it will rotate the U-shaped bracket 91 upon the shaft 92. Such movement of the lever 103 will so rotate the bracket 91 that the bent end of the bracket 91 will be raised thus operating the rod 87 and the arm 84 in such manner as to open the air valve 78.

The lower end of the arm 97 has a radial slot 107 formed therein which is adapted to rotatably and slidably receive a pin 108 which in turn is secured rigidly in the end of an arm 109. The opposite end of the arm 109 is secured to the end of the shaft 111 by which a rotary contact switch 112 is operated. The contact switch 112 is secured in an opening formed in the bracket 94 in such a way that the switch is behind the bracket with a threaded end part thereof projecting through the opening for receiving a nut 113 by which the switch is non-rotatably secured to bracket 94. The rotary switch 112 is provided with successive contacts 105 and 115 by which an electrical circuit may be made. The first contacts 105 are adapted to close the circuit through a resistance 110 associated with the switch, the second contact 115 being adapted to close a circuit around the resistance 110.

The switch 112 is adapted to close an electrical battery circuit 129 for operating the motor 63 which drives the blower 57 for discharging a blast of fresh air into the inlet compartment 47 of the casing 64, the air being thereafter heated in passing through the passages 46 of the heat exchanger 44 and being delivered as heated fresh air into the outlet compartment 48 of the casing 64. When the valve 78 is opened, the heated air in the outlet compartment 48 will be discharged through openings 73 and 74 and into the duct 72 from which the air will be distributed through openings 76 to the upper part of the automobile body by first passing across the surface of the automobile windshield.

The switch 112 is so positioned with respect to the bracket 94 that the first part of the downward movement of the lever 103 will close a circuit through the first contacts 105 of switch 112 and through the resistance 110 connected thereto. The motor 63 having a resistance in series therewith therefore will run at low speed for driving the blower 57.

The lever 103 also correlates the motor 63 and the valve 78 so that during the first part of the opening movement of the valve 78 the motor 63 will run at low speed. When the further movement of the lever 103 closes the second contacts of switch 112, the valve 78 will open to a greater extent than before and the motor 63 will run at a higher speed.

The arm 97 also has a laterally projecting part indicated at 114 in the end of which a rotary coupling member 116 is secured. The end of the coupling 116 projecting through the arm part 104 has a semispherical head indicated at 117 which is adapted to engage and slide over the surface of a rearwardly projecting part 118 of the bracket 97. Contact between the head 117 and the bracket 118 occurs during the latter part of the downward movement of the lever 103 and after the motor 63 has commenced to operate at the higher speed referred to. Such contact will indicate to the operator of the lever 103 that the lever has reached a position beyond which further movement of the lever 103 will cause an additional operation of the lever to be performed. Such operation will be performed by a rod indicated at 119 adapted to be secured by a set screw in a transversely disposed opening formed adjacent the outer end of the coupling member 116. The opposite end of the rod 119 has an eye 121 formed therein which is adapted to be secured upon a pin 122 projecting from the end of a pivotally mounted lever indicated at 123. The eye 121 is secured upon the end of the pin 122 by a snap fastener indicated at 124. The lower end of the lever 123 is formed in such a way as to provide a pair of laterally disposed guide members 126 having a pair of notches formed in ends and at the lower edges thereof, the notches referred to being adapted to pivotally support the lever 123 upon a pin 127. The pin 127 projects across and is secured at the ends thereof in the parallel vertical sides of a casing 128 in which the operating parts of the temperature actuated control 16 are contained.

Referring again to the shaft 92, it will be observed from Figure 4 that the outer end of the shaft rotatably supports another flanged collar indicated at 129, similar to the flanged collar 98, the two collars being disposed upon the shaft 92 in opposite relation to one another. The collar 129 is adapted to support an arm indicated at 131, the latter having an opening formed therein through which the collar 129 projects. The arm 131 is secured rigidly to the flanged part of the collar 129 by welding or other suitable fastening means.

The arm 131 has an operating part 132 in which an elongated radially disposed opening 133 is formed. The opening 133 is adapted to receive a pin 134 projecting from the end of an arm 136 mounted on the shaft 137 of a second rotary switch indicated at 138. The switch 138, like the switch 112, is mounted behind the bracket 97 and is secured thereto by means of a nut 139 which is adapted to operatively engage the threaded end of the casing of the switch 138, which projects through an opening formed in the bracket 94. The switch 138 has contacts 125 adapted to close a battery circuit 130 through the underseat heater motor 24 for operating the fan 23 driven by the motor for discharging a blast of air over the heating element 19 of the underseat heater 20. The arm 131 is actuated for operating the switch 138 by a lever 141 which is secured by a coupling 142 to an extension portion of the arm 131 which is indicated at 143. The coupling 142 is secured to the lever 141 and the extension 143 of the arm 131 by a bolt indicated at 144.

When the lever 141 is first moved downwardly out of its normally inoperative position, the arm 131 turns the arm 136 in such a way as to close the circuit 130 through the switch 138 which thereafter remains closed throughout the entire downward range of movement of the lever 141. Since the switch 138 is not provided with a resistance such as that associated with the first contacts of the switch 112, the switch 138 closes the circuit through the underseat heater motor 24 in such a way as to operate the motor at its highest speed throughout the entire range of movement of lever 141, after the initial movement of the lever out of its normally inoperative position.

The arm 131 also is provided with a radial part or extension indicated at 146, the end of which carries the rotary coupling member 147 which is secured to the arm by fastening means indicated at 148. Secured by a set screw in a transversely disposed opening formed in the coupling member 147 is a rod 151, the opposite end of which is provided with an eye indicated at 152 adapted to be secured to a pin 153 projecting laterally from the end of an arm 154. The arm 154 is pivoted at the lower end thereof on a pin which projects through one side of the control unit casing 128.

It will be apparent that downward movement of the lever 141 will rock the arm 154 upon the pin referred to throughout the entire range of movement of the lever 141.

The heating fluid control or water valve 14 comprises an annular seat adapted to be closed by upward movement of a disc-type valve which is secured on the lower extremity of a valve stem indicated at 156. The stem 156 projects through the upper end of the casing of the valve 14 and through a flexible rubber diaphragm or sealing member by which the upper end of the valve casing is closed. The sealing member referred to has a cap indicated at 157 which is secured to the central part of the diaphragm for preventing excessive flexible movement thereof. The pin or stem 156 is provided with an enlarged end or head by which the closed end of a U-shaped valve operating member 158 is secured to the cap 157. Downward movement of the operating member 158 will open the valve and upward movement thereof will close the valve.

The enlarged head of the valve stem 156 has an opening therein in which the end of a coil spring 159 is secured. The opposite end of the coil spring 159 extends around a pin 161 which projects across the space between and is secured to a pair of flanges indicated at 162, which projects upwardly from one end of a valve operating lever indicated at 163. The pin 161 also engages a pair of notches 164 formed inwardly with respect to the ends of the operating member 158. It will be apparent that the spring 159 resiliently holds the pin 161 in engagement with the inner extremities of the notches 164, although the pin may be moved outwardly within the notches against the force of the spring 159. When the end of the lever 163 supporting the pin 161 is moved upwardly and downwardly, it will be apparent that the valve 14 will close and open respectively for the purposes of supplying and cutting off heating fluid to and from the heating elements 19 and 44.

The lever 163 is pivotally mounted within the casing 128 upon the transversely disposed pin 127 which is secured at its ends in openings formed in the parallel sides of the casing 128. The middle part of the lever 163 between the pin 127 and the pin 161 has an opening 166 through which extends a pin 167 projecting from the head end of a temperature actuated power element or bellows thermostat indicated at 168. The opposite end of the power element 168 is supported on a base 169 forming the lower wall of the casing 128. The base 169 is secured to and supported by a bracket 171 having a flanged end 172 and a flanged side 173 secured by screws or other suitable fastening means to the end wall of the end casing 66 and the adjacent side wall of the casing 64. The bracket 171 therefore provides a mounting for the control unit 16 which locates the control unit 16 partly within the end casing 66 and at one side of the heater casing 64. The inlet coupling 13 and the outlet coupling 17 with which the valve 14 is provided, each projects through an opening formed in the lower wall of the casing 66 at one side of the casing 64. The openings referred to are closed by flexible collars 174 which are forced over the ends of the couplings 13 and 17 and against the lower wall of the casing 66. A spring 176 is located between the head end of the bellows or power element 168 and the lower surface of the lever 163 and around the opening 66 in the lever and the pin 167. The power element 168 is charged with a suitable fluid which will cause the power element to expand as the temperature thereof increases.

It will be apparent that expansion of the power element 168 will cause the spring 176 to press with increasing force upon the lower surface of the lever 163 thereby tending to cause the lever to pivot about the pin 127 in such a way as to raise the pin 161. It has previously been described that raising the pin 161 tends to close the valve 14.

The expansive force of the fluid affecting the power element 168 is opposed by a lever 177 which also is mounted at one end upon the pin 127. The middle portion of the lever 177 is provided with a depression 175 in which the upper extremity of the pin 167 is adapted to be seated. The lever 177 is urged resiliently downwardly against the pin 167 by a pair of springs indicated at 178 and 179. The spring 179 might be described as a factory adjustment for the control mechanism inasmuch as the upper end thereof is adapted to be supported by a flanged disc indicated at 181 which is rotatably mounted upon the lower end of a screw indicated at 182. The screw 182 is threaded in an opening formed in the central part of another flanged disc indicated at 183, the latter being positioned in an opening formed in a lever indicated at 184. The flanged part of the disc 183 is positioned against the lower surface of the lever 184 so that the spring 179 will tend to hold the disc within the opening formed in the lever 184. The screw 182 has a slotted head indicated at 186 by which a screw driver may be employed to adjustably position the screw 182 with respect to the disc 183. The screw 182 may be secured in any desired adjusted position with respect to the disc 183 by a locknut and washer indicated at 187.

The upper end of the spring 178 also engages the lower surface of the lever 184 at one side of and beyond the position of the disc 183 with respect to the opposite end of the lever 184 which is pivotally secured to the side walls of the casing 128 upon a transversely disposed pin indicated at 188. Secured to the upper surface of the lever 184 and projecting through a slot formed in the upper wall of the casing 128 and inside the arm 154 is a cam element indicated at 189. The cam element 189 has a cam surface 191 which extends away from the lever 184 as the distance of the surface increases from the pivoted end of the lever 184. Adjacent the pivoted end of the lever 184 the cam 189 is formed in such a way as to provide a stop 192 against which a roller 193 which also engages the cam surface 191 is adapted to repose when the lever 141 is in its normally inoperative position. The roller 193 is rotatably mounted upon the pin 153 by which the arm 154 is secured in the eye 152 formed at the end of the rod 151. A spring 196 having one end secured in a flange 197 formed on the base 169 of the casing 128 and having the opposite end thereof engaging the pin 153 outside the eye 152 tends resiliently to urge the roller 193 upwardly with respect to the sloping surface of the cam 189 after the lever 141 has been moved downwardly out of its normally inoperative position.

It will be apparent that downward movement of the lever 141 will move the roller 193 away from the stop 192 and upwardly along the sloping surface of the cam 189. As the roller 193 moves upwardly upon the sloping surface of the cam 189, the cam 189 will progressively depress the lever 184 by rotating the latter upon the pin 188. As the lever 184 rotates upon the pin 188 it will be apparent that both of the springs 178 and 179 will be compressed to a greater and greater extent. Such compression of springs 178 and 179 will apply progressively increasing forces to the lever 177 and the pin 167 and hence the expansive force of the power element 168 will be increasingly opposed.

The force exerted by the spring 176 which tends at all times to close the valve 15 may under any conditions of operation be overcome by an upward movement of the end of the lever 163 which extends beyond the pin 127. Such upward movement of the lever may be affected by operation of the lever 123 which is provided with an opening 198 through which the outer end of lever 163 projects. The upper and lower extremities of the opening 198 are formed in such a way as to provide stops indicated at 199 and 201, the two stops being spaced at the ends thereof adjacent the end of the lever 163 to permit operation of the lever 123 between two extreme positions. The stop 201 is far enough away from the lever 163 to permit movement of the lever 123 and the lever 163 throughout the entire range of operations of both levers. However the stop 199 is so positioned with respect to the lever 163 that the stop 199 will engage the lever 163 in such manner as to force open the valve 14 when the lever 163 approaches the downward limit of movement thereof and just beyond the position at which the detent 117 will engage the projecting end 118 of the bracket 84. When the stop 199 so engages the lever 163 the lever 163 will be manually rotated upon the pin 127 in such manner as to open the valve 14 against the force of the spring 176 and without regard to the force being exerted by the expansible element 168. A spring 202 having one end secured to the pin 127 and another in an opening formed in a struck-out tab 203 projecting from an intermediate portion of the lever 123 tends resiliently to aid the movement of the lever 123 in its movement toward a position in which the stop 199 will engage and actuate the lever 163.

The opposite end of the lever 163 carries a bar 204 of material that is relatively not conductive of electrical energy. The bar 204 is adapted to open a shunt switch 190 contained within the switch casing indicated at 206 when the upward movement of the lever 163 moves into such a position as almost to close the valve 14. The switch 190 referred to is shunted across a circuit in which an electrical resistance 200 is contained within a part 207 of the casing 206. The resistance 200 and the shunt switch 190 are connected in series with the motor 24 employed in operating the fan 23 for blowing air across the heat exchange element 19 of the underseat heater 20 employed in the system.

It will be apparent that the motor 24 will run at low speed when the resistance 200 is in series with the motor and will run at high speed when the shunt switch 190 bridges the circuit leading to and from the resistance. The fan motor 24 therefore will run at low speed when the lever 163 is moved into a position when the valve 14 approaches its closed position and will run at high speed when the valve 14 is in any of its more open positions.

The power element or bellows 168 is provided with an extension element in the form of a capillary tube 208 which is connected to the bottom wall of the extension element and projects away from the element through a passage formed in the base 169 and between the base 169 and the bracket 171. The opposite end of the tube 208 terminates in a bulb 209 attached to a bracket 211 having openings 212 formed at opposite ends thereof and by which the bracket may be attached to any desired part of the interior of an automobile body. The bracket 211 is formed on each side of the bulb 209 to provide upwardly projecting walls which terminate in outwardly projecting flanges indicated at 213. The walls adjacent the bulb 209 protect the bulb from possible injury by external pressure and the flanges provide guide means whereby the excessive length of the tube 208 may be wound around the bulb and between the flanges 213 and the ends of the bracket 211. The bulb 209 preferably is secured to an upper part of the firewall 69 and at one side of the heater 49 and in a position relatively remote from the heater 49 so as to be affected by the temperature inside the automobile rather than by the temperature of the heater 49. In such position it will be apparent that the bulb 209 will be cooled by ambient air whenever there is a pronounced change in the temperature inside of the automobile body as for example when a door of the automobile may be opened. Under such conditions the cooling of the bulb 209 will take over control of the control element 16 by tending to contract the power element 168 and notwithstanding the fact that the power element 168 may be in the region which is warmer than the bulb 209.

The power element 168 also is adapted to be controlled and affected by a combination of the temperatures of the outside air supplied to the heater 49, by the temperature of the air discharged from the heater 49, and by the temperature of the ambient air adjacent the heater 49. This combination control is brought about by the provision of a heat exchange device indicated generally by the numeral 214. The device 214 comprises an elongated, flat casing member 216 which is secured to one side of the casing 64 of the heater 49 and which extends from near the top of the casing 64 to near the bottom thereof. The casing 216 is welded or otherwise secured to one side of the casing 64 almost within the compartment 67 which is formed at one side of the end casing 66 and within which the control unit 16 is partially located. The bottom of the casing 216 is positioned directly opposite the central part of the power element 168 while the top thereof extends upwardly therefrom and terminates in a region above the heat exchange element 44 and opposite the heater outlet compartment 48. The casing 216 is relatively wide and flat in proportion to the cross-sectional area thereof so that it will present a relatively large heat exchange surface to the ambient air within the automobile body and immediately adjacent the heater casing 64. The width of the casing 216 also will cover a relatively wide part of the side wall of the casing 64 to which the casing 216 is secured. Such relatively wide part of the casing 64 also will act as a heat exchange surface of considerable extent compared to the cross-sectional area of the space between the casing 216 and the side wall of the casing 64. An opening 217 is formed in the side wall of the casing 64 at the upper end of the casing 216 for the purpose of admitting air from the outlet compartment 48 to the interior of the casing 216. The opening 217 permits fresh outside air which has been heated by the heating element 44 to flow into the transfer compartment 218 which is formed between the casings 216 and the side wall of the casing 64. The lower end of the casing 216 also is provided with an opening indicated at 219 for the purpose of discharging the heated air so admitted to the transfer compartment 218 upon the heating element 168. An opening 221 is formed in one of the outwardly depressed sides of the casing 128 containing the power element 168 for the purpose of permitting the air from the opening 219 to enter the casing 128 and to be so discharged upon the power element 168.

It will be apparent that the air admitted to the transfer passage 218 through the opening 217 will be heated air from the compartment 48, such air having been heated by reason of its passage through the heat transfer element 44. It will also be apparent that the air within the outlet compartment 48 which will be admitted through the opening 217 will be air that is heated by the outlet end of the heat exchange element 44 since the opening 217 is immediately above and at one side of the part of the heat exchange element 44 where the heating fluid outlet compartment 52 is formed. The heated air admitted to the opening 217 therefore will reflect the temperature of the air at the outlet end of the heat exchange element 44.

As the air admitted to the opening 217 flows through the passage 218 toward the outlet opening 219 therefrom, it will be apparent that such air will come in contact with heat exchange surfaces that reflect temperatures other than the temperature of the outlet end of the heat exchange element 44. For example, one side of the transfer passage 218 is formed by a side wall of the casing 64 that passes along the side of the heat exchange element 44 and at one side of the fresh air inlet compartment 47. The air which passes through the transfer compartment or passage 218 therefore will be affected by the temperature of the outside air which is admitted to the heat exchange element 44 from the outside air inlet compartment 47. It will therefore be apparent that air entering the transfer passage 218 at any temperature resulting from the air having been heated by the heat exchange element 44 will leave the transfer passage 218 through the opening 219 at a different temperature, depending upon the temperature of the outside air supplied to the compartment 47. For example, on a cold day the air in the transfer passage 218 will be reduced in temperature by engagement with a portion of the side wall of the casing 64 opposite the compartment 47, to a greater extent than it will be on a warmer day. The air discharged by the opening 219 will therefore tend to cool the power element 168 to a greater extent on a cold day than it will on a warm day. As a consequence of this greater cooling of the bellows 168 on a cold day than on a warm day, the power element 168 will tend to open the valve 14 to a greater extent on a cold day than it will on a warm day.

The bellows or power element 168 therefore will be affected not only by the temperature of the air discharged from the heating element 44 but it will be variably affected by the temperature of the outside air supplied to the heater 49.

Not only will the air in the transfer compartment 218 be affected by the temperature of the air discharged from the heating element 44 and by the temperature of the outside air but by reason of the extensive heating surface provided by the outside of the casing 216, the power element 168 also will be affected by the temperature inside of the automobile and immediately adjacent the heating unit 49. The outside surface of the casing 216 is exposed to the ambient air inside the automobile and immediately adjacent the heater 49 and if the automobile has just been started and the air inside the automobile is cold, then the ambient air affecting the outside surface of the casing 216 will tend to cool the air flowing through the transfer passage 218 to a greater extent than it will if the inside of the automobile is warm as it will be after the automibile heating system has been in operation for some time.

Hence it will be apparent that this response of the air flowing through the transfer passage 218 to the temperature inside the automobile will cause the valve 14 to be opened by the power element 168 earlier and to a greater extent when the automobile is cold than it will when the automobile is warm. Such characteristic of the air flowing in the transfer passage 218 will cause more water or heating fluid to be supplied to the heating elements 19 and 44 when the automobile is cold than when the automobile is warm. Consequently the automobile will be supplied with more heat at any setting of the control lever 141 when the automobile is cold than it will after the automobile has been brought up to a proper temperature and then has cooled off to such an extent that a small amount of heat is required to bring the interior temperature of the automobile back to the desired temperature.

For example, if the automobile is started on a moderately cold day, then the operator of the automobile will not be required to push the lever 141 all the way down in order to quickly heat the automobile. The operator can push the lever 141 down a relatively short distance such as the operator may estimate will provide sufficient heating for that particular day. However, due to the fact that the automobile has just been started and that the air inside the automobile has not been heated, then the ambient air engaging the outside surface of the casing 216 will have a greater than normal effect upon the temperature of the air within the heat transfer passage 218 and will cool the air in the passage 216 to a greater extent than the air would have been cooled had the automobile already been heated to the desired temperature. The effect of such relatively cool air being discharged from the heat transfer passage 218 will cause the power element 168 to be contracted to a greater extent than it would have been with the same setting of the lever 141 and a warm automobile and consequently the power element 168 will tend to contract to the maximum extent, thereby opening the valve 14 to a maximum extent. Heating fluid therefore will be supplied by the valve 14 to the heating elements 19 and 44 at a greater than normal rate and consequently the automobile will heat up rapidly. However, after the heater has been in operation for some time and the interior of the car has been warmed to a temperature corresponding to the setting of the lever 141, then the ambient air affecting the outside surface of the casing 216 will not so greatly reduce the temperature of the air in the transfer passage 218 and consequently will affect the power element 168 to a lesser extent than before. The power element 168 will open the valve 14 under such circumstances and whenever the temperature of the automobile falls below the setting corresponding to the position of the lever 141, but it will not be opened to such a great extent and therefore will not supply heating fluid to the heating elements 19 and 44 at a maximum rate.

The air flowing within the transfer passage 218, being affected not only by the temperature at the outlet from the heat exchange element 44 and by the temperature of the outside air and by the temperature inside the automobile, causes the heating system to operate at a variable rate, such rate being a maximum in each instance when the temperature outside the automobile is relatively low and when the temperature inside the automobile is relatively low.

However, notwithstanding the temperature either inside or outside of the automobile, it is possible to open the valve 14 to a maximum extent for the purpose, for example, of supplying excessively heated air for defrosting or de-icing a windshield. This may be done merely by depressing the lever 103 to a maximum extent and under which circumstances the lever 103 will cause the lever 123 to pivot upon the pin 127 until the stop 139 engages the lever 163 to open the valve 14 manually and without regard to the temperature of the power element 168.

The bottom wall of the casing 64 has an opening formed therein at 222. The opening 222 is adapted to be closed by a door 224 having flanged outwardly directed edges adapted to seat against a soft rubber gasket 226 which is secured to the inside of the bottom wall of the casing 64 around the opening 222. The door 224 is secured by screws 225 to a shaft 227, the latter being secured rotatably within the casing 64 on flexible rubber bearings indicated at 228 and 229. The bearing 229 is cemented or otherwise secured in an opening formed in one of the side walls of the casing 64 while the bearing 228 is similarly secured in an opening formed in the opposite side wall of the casing 64. The shaft 227 projects beyond the bearing 228 and through the side wall of the casing 64 and there supports an arm indicated at 231, the latter having secured to the outer end thereof a rotatable coupling member 237 having a transverse opening 238 formed therein. The coupling 237 is secured to the arm 231 by a screw 239 which projects through an opening in the end of the arm and into a threaded axial opening formed in the coupling member 237. Between the head of the screw 239 and the end of the arm 231 is a pair of washers indicated at 241, the one adjacent the arm 231 being a flexible washer adapted to be compressed when the head of the screw 239 is tightened upon the other of the two washers. The screw 239 is tightened in such manner for the dual purposes of securing the coupling member 237 to the arm 231 and of securing the end of a Bowden wire in the opening 238. The opposite end of the Bowden wire referred to is connected to an operating knob or lever located on the instrument panel of the automobile. By operating the knob or lever referred to the Bowden wire may be caused to actuate the arm 231 for the purpose of opening and closing the door 224 with respect to the opening 222.

The door 224 may be opened or closed for the purpose of admitting fresh air from outside the automobile to the lower part of the interior of the automobile. When the door 224 is opened, it will be apparent that a large part of the air supplied to the heater 49 will not pass through the heating element 44 but will flow through the opening 222 into the lower part of the automobile body and will cool the lower part of the automobile body. The door 224 may be used either in summer or winter, in winter for cooling off the automobile when too much heat has been supplied thereto, or in summer merely for supplying fresh air to the lower part of the inside of the automobile.

By depressing the lever 103 it is possible to supply fresh air to the upper part of the inside of the automobile in summer and without heating the air. This may be done merely by allowing the lever 141 to remain in its normally inoperative position and by pushing the lever 103 part of the way down. Such movement of the lever 103 will partly open the air valve 78 and will actuate the switch 112 in such manner as to start the operation of the blower motor 63 at low speed. Since the lever 141 has not been depressed, the springs 178 and 179 will not be compressed by the operation of the cam 189 and the roller 193 to a sufficient extent to cause the opening of the valve 14 against the force of the power element 168 tending to close the valve. Fresh air therefore may be supplied to the upper part of the automobile by operation of the lever 103 without depressing the lever 141 and may be supplied to the lower part of the automobile by opening the door 224.

If it is desired either to defrost a windshield or to supply heated fresh air to the upper part of the automobile, then it is necessary to depress the lever 141 to any extent depending on the amount of heat that may be desired. Such a depression of the lever 141 will operate the roller 193 and cam 189 to compress the springs 178 and 179 to oppose the operation of the power element 168 which tends to hold the valve 14 in closed position. When the springs have been sufficiently compressed to overcome the force exerted by the power element 168, then the valve 14 will open, allowing hot water from the engine circulating and cooling system to be introduced as heating fluid into the heating element 19 and then to the heating element 44. The downward movement of the lever 103 will result in the operation of switch 112 and the closing of an electrical circuit through the blower motor 63. The blower motor thereupon will draw in fresh air from outside the automobile and will force the air through the heating element 44 and against the windshield and into the upper part of the automobile through the openings 76. The depression of the lever 103 will open the valve 78 to an extent proportional to the amount by which the lever 103 has been depressed. By variably depressing the lever 103 it will be apparent that variable amounts of heated fresh air may be introduced into the upper part of the automobile for either heating or defrosting purposes.

If it is desired to de-ice the windshield then the lever 103 may be pushed all the way down which will result in opening the valve 14 by operation of the lever 123 in a manner heretofore described.

Depression of lever 141 for the purpose of causing the valve 14 to be opened by compression of the springs 178 and 179 will also start the motor for the underseat heater unit, this being the result of the operation of switch 138. Starting of the motor of the underseat heater will result in recirculating the air inside the automobile and in additionally heating the air.

If the lever 141 is depressed without depressing the lever 103, then the interior of the automobile will be heated entirely by operation of the recirculating heater as previously described.

It will be apparent that the lever 141 has two functions. It controls the underseat heater fan by operating the switch 138 which closes the high speed circuit through the fan in all positions of the lever 141. After the switch 138 has been turned on, then the fan speed for the underseat heater remains at high speed until such time as the heating of the power element 168 may almost close the valve 14. Then, the lever 163 will operate the bar 204 in such manner as to open the shunt switch around the resistance contained within the casing 207 and thereafter the underseat heater motor will operate at low speed.

The other function of the lever 141 is to regulate the temperature to which the car is to be heated. This is accomplished by variably opposing the operation of the power element 168 which tends at all times to close the valve 14. Such variable opposition to the closing of the valve 14 is brought about by the variable compression of springs 178 and 179 as the result of the movement of the roller 193 along the surface of the cam 189. The farther the lever 141 is depressed, the further the roller 193 will rise upon the cam surface 191 which thereby forces the lever 184 downwardly for compressing the springs 178 and 179. Such variation in the compression of the springs 178 and 179 determines the extent to which the valve 14 will open in opposition to the power element 168 tending to close the valve.

When the temperature of the inside of the automobile reaches the point desired, and which point is determined by the extent to which the lever 141 is depressed, the heating of the power element 168 by the heated fluid discharged thereon by the operation of the transfer passage 218 will tend to close the valve 14 against the compression of the springs 178 and 179, thereby shutting off the heating fluid to the heating elements 19 and 44 and reducing the speed of the underseat heater motor to low speed. However, the car temperature may suddenly be reduced by opening the doors of the automobile or for some other reason. Or, the lever 141 may be pushed downwardly to a greater extent than before for the purpose of obtaining more heat. Then, the valve 14 will be opened either by the cooling of the bulb 209 or by the further compression of the springs 178 and 179. As the valve 14 is again opened, the underseat heater fan will again be speeded up to high speed as a result of cutting out the resistance by closing the shunt switch contained within the casing 206.

The lever 103 controls the defrosting of the windshield of the automobile and the supply of air to the upper part of the automobile entirely by regulating the amount of fresh air delivered through the openings 76. As the lever 103 is pulled downwardly, the air volume is increased by opening the air valve 78, by turning the blower 63 on first to low speed and thereafter to high speed and by completely opening the valve 14 for supplying a maximum quantity of heating fluid to the heating element 44 for defrosting and de-icing purposes.

It will be apparent that the temperature at which the valve 14 will open and close for any position of the lever 141 will depend upon the temperature of the air discharged upon the power element 168 from the transfer passage 218. The temperature of the air so discharged upon the heating element 168 will be modified by the temperature of the interior of the car, by the temperature of the air outside the automobile, and by the temperature of the discharge end of the heating element 44. Such modification of the temperature of the air discharged upon the power element 168 makes it possible quickly to heat up the interior of an automobile without pushing the lever 141 all the way down and thereafter when the automobile is heated, for readjusting the lever 141 to the position corresponding to the temperature desired.

The capillary tube or extension 208 and the bulb 209 which is located remotely from the heater 49 also modifies the operation of the power element 168 in such manner as to cause the valve 114 to move to wide open position whenever the car has been cooled off suddenly and without any readjustment of the lever 141. The bulb 209 has an additional function of controlling the operation of the valve 14 when the valve 78 is entirely closed. Under such conditions, the only air flowing through the core 44 is that which passes outwardly from the casing 64 through the transfer passage 218. Such air therefore becomes very warm and would tend to excessively heat the power element 168 except for the fact that the power element 168 has the extension provided by the capillary tube 208 and by the bulb 209, the latter being located in such position as not to be affected by the temperature of the air in the transfer passage 218. Whenever such condition occurs and the air in the transfer passage 218 becomes warmer than the bulb 209, the bulb 209 takes over control of the valve 14 and operates the same on the basis of the interior temperature of the automobile as such temperature is reflected in the temperature of the air affecting the bulb 209.

Heretofore the combination of a recirculating and a fresh air heater with a common control system has always been difficult, due to the fact that for a given water flow the outlet air temperatures of the fresh air and recirculating heaters vary by different amounts due to the changes in outside air temperatures. For example, a drop of 1° F. in the outside air temperature will drop the outlet air temperature of a fresh air heater perhaps .8° F. while the same drop in outside air temperature will decrease the outlet air temperature of a recirculating heater only perhaps .5° F. It is obvious therefore that for a given water flow which is the same for both fresh air and recirculating heating units, and which is regulated to give the same temperature, the fresh air unit will deliver air at lower temperature in cold weather than in warm weather and relative to the air delivered by a recirculating heater under such conditions. With fresh air being delivered to the upper level of the interior of an automobile, this is the opposite of the condition that is desired, inasmuch as the interior of an automobile is more comfortable if the upper level is relatively warmer in cold weather and cooler in mild weather. The present system compensates for this defect by having the warm water from the engine pass first through the water control valve, then to the underseat or recirculating heater, and then to the heater for supplying air to the upper level in the interior of the automobile. Such a method of circulating and controlling the heating fluid in the present system limits the amount of heat supplied in mild weather by limiting the water flow to a relatively small amount. The temperature drop of the water passing through the underseat heater is therefore considerable and relatively cool air therefor is supplied by the fresh air heater to the upper regions within the automobile body. However, in cold weather when more heat is demanded and the water valve is opened to a normally greater extent to provide for a greater flow of water to both heaters, then the water discharged from the underseat heater has a proportionally smaller temperature drop and is thus supplied to the fresh air heater at the relatively higher temperature. By supplying heating fluid to the fresh air heater at such relatively higher temperature it will be apparent that the fresh air delivered to the upper level in the automobile will be at relatively higher temperature under such conditions.

I claim:

1. An automobile heating system comprising an underseat heater adapted to be placed under one of the front seats of an automobile for recirculating and heating the air in said automobile, a second heater for said automobile, said second heater being provided with an inlet for admitting fresh air from outside of said automobile for heating said air and for circulating said air throughout said automobile, heating fluid connections for said heaters for supplying heating fluid to said heaters and for exhausting said heating fluid therefrom, a temperature responsive valve in said connections for controlling the flow of heating fluid to and from said heaters, said valve being positioned in said connections to control the flow of said heating fluid to said underseat heater, said fresh air heater being connected in the return line connection from said underseat heater.

2. An automobile heating system comprising an underseat recirculating heater and a fresh air heater connected in series in a heating fluid circulating system for supplying heating fluid for heating said heaters, and a temperature actuated valve associated with said fresh air heater for controlling the flow of said heating fluid first to said underseat heater and then to said fresh air heater.

3. An automobile heating system comprising an underseat recirculating heater and a fresh air heater, means for circulating air over said heaters for heating the interior of said automobile, inlet conduit means for circulating heating fluid to said underseat heater, exhaust conduit means from said underseat heater for supplying the heating fluid to said fresh air heater, a temperature actuated valve for controlling the flow of fluid to said underseat heater through said inlet conduit means, outlet conduit means for exhausting heating fluid from said fresh air heater, said temperature actuated valve having a power element associated with said fresh air heater and being disposed in heat exchanging relation to a portion of said fresh air heater adjacent said outlet conduit means.

4. An automobile heating system comprising a pair of heaters adapted to be positioned at different locations within the interior of an automobile, means for circulating air over said heaters for heating the interior of said automobile, conduit means for connecting said heaters in series for supplying heating fluid to and from said heaters for heating the interior of said automobile, a temperature actuated valve having a power element, said valve being disposed in said conduit means in a position to control the flow of said heating fluid to one of said heaters, said power element being disposed in heat exchange relation to the other of said heaters and in such position as to respond to the temperature adjacent the outlet from said other of said heaters.

5. A heating system for automobiles comprising a recirculating heater for heating the lower part of an automobile body, a fresh air heater for heating the upper part of said body, duct means having apertures adjacent the front window of said body for distributing the air from said fresh air heater over said front window, conduit means for supplying heating fluid to said recirculating heater, a temperature controlled valve having a power element, said valve being adapted to control a supply of heating fluid to said recirculating heater, conduit means for supplying said heating fluid from said recirculating heater to one side of said fresh air heater, outlet conduit means for discharging said heating fluid from the opposite side of said fresh air heater, said power element for said temperature actuated valve being operatively disposed in heat exchanging relation to said opposite side of said fresh air heater for controlling the circulation of fluid in said system in response to the temperature of said opposite side of said fresh air heater.

6. A heating system for automobiles comprising a recirculating heater for heating the lower part of an automobile body, a fresh air heater for heating the upper part of said body, a temperature actuated valve having a power element, conduit means controlled by said valve for supplying heating fluid to said recirculating heater, connecting conduit means for supplying heating fluid from said recirculating heater to said fresh air heater, outlet conduit means for discharging said heating fluid from said fresh air heater, means for circulating air inside said body and across said recirculating heater, means for introducing fresh air from outside said body to said fresh air heater and for circulating said air over said fresh air heater and throughout said body, and heat exchange means responsive to the temperature of said body, to the temperature of said outside air received by said fresh air heater, and to the temperature of said outside air discharged by said heater for controlling the operation of said power element for said valve.

7. A heating system for a vehicle body comprising a heating element, means for circulating heating fluid to and from said element, a temperature actuated valve for controlling the flow of said heating fluid, means for supplying outside air to said heating element and for circulating said air from said heating element throughout said body, a power element for operating said valve, and an air conducting duct connected to the discharge side of said heating element and having the end thereof positioned to discharge said air upon said power element, said duct being formed to provide portions thereof of relatively large area in heat exchange relation to the air admitted to the inlet side of said heating element and to the air within said automobile body.

8. A heating system for a vehicle body comprising a heat exchange element, duct means for supplying outside air to said heat exchange element, duct means for delivering said air from said heat exchange element to the interior of said body, conduit means for circulating heating fluid to and from said heat exchange element, a temperature actuated valve for controlling the flow of said heating fluid to said heating element, a power element for actuating said temperature actuated valve, heat exchange means for actuating said power element, said heat exchange means being adapted to conduct heated air from the discharge side of said heating element to said power element, said heat exchange means being constructed with heat exchange surfaces thereon, one of said surfaces being responsive to the temperature of the air supplied to said heating element, another to the temperature inside said body and adjacent said heating element, and extension means for said power element and having a fluid-containing bulb associated therewith, said bulb being adapted to be located away from said heating element for controlling the operation of said power element whenever an abrupt reduction in temperature may occur within said body and adjacent said bulb.

9. An automobile heating system comprising a heating element having an air inlet and an air outlet, means for circulating heating fluid throughout said heating element, a temperature actuated valve for controlling the flow of said heating fluid through said heating element, a power element for controlling the operation of said valve, and a duct connected to the outlet for said heating element for receiving heated air from said heating element and for conducting said heated air to said power element, said duct being adapted to extend in thermally contacting relation to said heating element inlet and in thermally contacting relation to the air within the body of said automobile.

10. An automobile heating system comprising a recirculating heater and a fresh air heater, each of said heaters having motor driven means for circulating air thereover, conduit means for circulating heating fluid first to said recirculating heater and then to said fresh air heater, a valve for controlling the admission of said heating fluid through the inlet conduit leading to said recirculating heater, a temperature responsive power element for closing said valve in response to temperature increases in the passenger compartment of said automobile, means for opposing the operation of said power element for closing said valve, manually operable means for varying the effect of said power element opposing means, and means responsive to the closing movement of said valve for decreasing the speed of said recirculating heater motor.

11. An automobile heating system comprising an air recirculating heater and a fresh air heater, conduit means for circulating heating fluid in series first to said recirculating heater and then to said fresh air heater, a valve in the inlet conduit to said recirculating heater for controlling the flow of heating fluid through said heaters, a power element disposed in heat exchange relation to said fresh air heater and having lever means associated therewith for closing said valve in response to temperature increases in the passenger compartment of said automobile and in said fresh air heater, two-speed motor driven means for circulating air in the passenger compartment of said automobile over said air recirculating heater, and means responsive to the operation of said lever for reducing the speed of said motor to the lowest of the two speeds of said motor when said valve is moved into closed position by said power element.

12. An automobile heating system comprising an air recirculating heater and a fresh air heater, conduit means for circulating heating fluid in series through said heaters and from said recirculating heater to said fresh air heater, a valve for controlling the flow of said heating fluid to said recirculating heater, motor driven means for supplying fresh air to said fresh air heater and for circulating said fresh air from said heater to the passenger compartment of said automobile, an air valve for controlling the flow of said fresh air delivered to said automobile from said fresh air heater, a lever accessible from within said automobile for operating said valve, means responsive to the operation of said lever for starting said motor at low speed and for thereafter increasing the speed of said motor to higher speeds as said air valve is further opened, a heating fluid valve for controlling the supply of heating fluid to said recirculating heater, and means responsive to the final opening movement of said lever for manually opening said heating fluid valve.

13. An automobile heating system comprising a recirculating heater and a fresh air heater having conduit connections for circulating heating fluid first to said recirculating heater and then to said fresh air heater, a heating fluid valve for controlling the flow of heating fluid to said recirculating heater, a power element for closing said valve in response to increases in temperature in the passenger compartment of said automobile, motor driven means for supplying fresh air to said fresh air heater and for discharging said fresh air from said fresh air heater to the interior of said automobile, an air valve for controlling the flow of said fresh air from said fresh air heater to the interior of said automobile, a switch and resistance element for operating said motor at low speed and at high speed, and a manual control for said heating system, said manual control means having connections for progressively opening said air valve, for operating said motor first at low speed and then at high speed, and when said motor is operating at high speed and said air valve is fully opened, for opening said heating fluid valve in opposition to said power element.

14. An automobile heating system comprising an air recirculating heater and a fresh air heater, heating fluid conduits for supplying heating fluid first to said recirculating heater and then to said fresh air heater, a heating fluid valve for controlling the supply of heating fluid to said recirculating heater, a power element for closing said valve in response to increases in temperature affecting said power element, heat exchange means responsive to the temperature of said fresh air heater for controlling the operation of said power element, power element extension means having a bulb located remotely from said fresh air heater for controlling the operation of said power element, manually operable means for variably opposing the opening of said valve by said power element, and manually operable means for opening said valve in opposition to said power element.

CLARENCE V. CROCKETT.

References Cited in the file of this patent

UNITED STATES PATENTS

| Number | Name | Date |
|---|---|---|
| 2,262,496 | Hobbs et al. | Nov. 11, 1941 |
| 2,342,901 | Schutt et al. | Feb. 29, 1944 |
| 2,490,919 | Raney | Dec. 13, 1949 |